US007245296B2

(12) United States Patent
Edwards et al.

(10) Patent No.: US 7,245,296 B2
(45) Date of Patent: Jul. 17, 2007

(54) ACTIVE MATRIX DISPLAY DEVICE

(75) Inventors: Martin J. Edwards, Crawley (GB); John R. A. Ayres, Reigate (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 550 days.

(21) Appl. No.: 10/320,269

(22) Filed: Dec. 16, 2002

(65) Prior Publication Data

US 2003/0117389 A1 Jun. 26, 2003

(30) Foreign Application Priority Data

Dec. 21, 2001 (GB) ................................ 0130601.8

(51) Int. Cl.
*G09G 2/00* (2006.01)

(52) U.S. Cl. ........................ 345/211; 345/92; 345/205; 345/206

(58) Field of Classification Search ................ 345/211, 345/92, 205, 206, 205–6
See application file for complete search history.

(56) References Cited

U.S. PATENT DOCUMENTS

| | | | | |
|---|---|---|---|---|
| 4,582,395 | A * | 4/1986 | Morozumi | 349/43 |
| 5,130,829 | A | 7/1992 | Shannon | 359/59 |
| 5,835,170 | A * | 11/1998 | Fujiwara et al. | 349/38 |
| 5,923,390 | A * | 7/1999 | Jung Mok et al. | 349/38 |
| 6,208,463 | B1 | 3/2001 | Hansen et al. | 359/486 |
| 6,222,510 | B1 * | 4/2001 | Etoh | 345/55 |
| 6,476,419 | B1 * | 11/2002 | Yasuda | 345/92 |
| 6,628,258 | B1 * | 9/2003 | Nakamura | 345/98 |
| 2001/0035863 | A1 * | 11/2001 | Kimura | |

FOREIGN PATENT DOCUMENTS

| | | |
|---|---|---|
| WO | WO9952012 | 10/1999 |

* cited by examiner

*Primary Examiner*—Sumati Lefkowitz
*Assistant Examiner*—Tammy Pham

(57) ABSTRACT

A display device with capacitive display pixels, in which a drive scheme is used for capacitive coupling of voltages to enable reduced column voltage swings to be obtained. Each pixel has two storage capacitors. The use of two storage capacitors provides some freedom in the choice of the magnitude of the voltage swing provide on one terminal of one of the storage capacitors. The first capacitor (C1) of all pixels of the display may be grounded, and only the second capacitor (C2) is subjected to changes in voltage to be capacitively coupled to the display cell. This provides a flexible capacitor line drive type scheme.

13 Claims, 4 Drawing Sheets

ACTIVE MATRIX DISPLAY DEVICE

This invention relates to active matrix display devices, in particular having a pixel configuration having a storage capacitor.

This type of display typically comprises an array of pixels arranged in rows and columns. Each row of pixels shares a row conductor which connects to the gates of the thin film transistors of the pixels in the row. Each column of pixels shares a column conductor, to which pixel drive signals are provided. The signal on the row conductor determines whether the transistor is turned on or off, and when the transistor is turned on, by a high voltage pulse on the row conductor, a signal from the column conductor is allowed to pass on to an area of liquid crystal material (or other capacitive display cell), thereby altering the light transmission characteristics of the material.

It is well known to provide an additional storage capacitor as part of the pixel configuration to enable a voltage to be maintained on the liquid crystal material even after removal of the row electrode pulse. U.S. Pat. No. 5,130,829 discloses in more detail the design of an active matrix display device.

The frame (field) period for active matrix display devices requires a row of pixels to be addressed in a short period of time, and this in turn imposes a requirement on the current driving capabilities of the transistor in order to charge or discharge the liquid crystal material to the desired voltage level. In order to meet these current requirements, the gate voltage supplied to the thin film transistor needs large voltage swings. For example, in a display using low temperature polysilicon transistors, the minimum row drive voltage may be around −2 Volts and the maximum around 15 Volts. This ensures the transistor is biased sufficiently to provide the required source-drain current to charge or discharge the liquid crystal material sufficiently rapidly.

The requirement for large voltage swings in the row conductors requires the row driver circuitry to be implemented using high voltage components.

The pixel drive signal on the column conductor also typically has a large voltage swing. For example, a 10 Volts swing on the column conductors may be required, particularly to invert the polarity of the drive voltage of the LC. The largest peak to peak voltage corresponds to the difference between the voltages for the black state in the two different polarities. The smallest peak to peak voltage corresponds to the difference between the voltages for the white state in the two different polarities. A 10 Volt peak to peak drive signal is likely to be the maximum drive voltage for a conventional TN LC cell, and different liquid crystal materials as well as different LC cell technologies (for example different twist angles and different optical configurations) will require lower voltage swings. For example a peak to peak voltage swing of 5.6 Volts may be required. This voltage may still be higher than the desired supply voltage for a portable battery operated device using the display.

Therefore, various drive schemes have been proposed enabling the voltage swing on the column conductors to be reduced, so that lower voltage components may be used in the column driver circuitry. In some examples, this is achieved by coupling an additional component of liquid crystal drive voltage to the pixel using the storage capacitor. Drive schemes in which this is done include the capacitor line drive scheme and the four level row drive scheme.

The four-level drive scheme uses more complicated row electrode waveforms in order to reduce the voltage swing on the column conductors, using capacitive coupling effects. The capacitor line drive scheme couples a stepped voltage waveform to one end of the storage capacitor (the voltage being applied to all pixels in a row), and the transitions in this voltage waveform give rise to step changes in the voltage across the LC cell.

In the so-called common electrode drive scheme, a component of the LC drive voltage is applied to the common electrode of the display. An alternating voltage is applied to the storage capacitors to avoid division of the voltage component across the LC capacitance and the storage capacitance.

Whilst these drive schemes enable lower voltage components to be used for the column driver circuitry, they result in more complicated row conductor waveforms (in particular having a plurality of voltage levels) and/or require additional drive voltages for application to other electrodes of the display. This makes the power supply circuitry more complicated and may require additional circuit elements such as charge pumps, voltage regulators, potential dividers and amplifiers. These components contribute to the power consumption of the display and increase the complexity of the circuitry required to operate the display.

According to the invention, there is provided a display device comprising an array of capacitive display pixels, each pixel comprising a thin film transistor switching device and a capacitive cell, the cell being connected between the switching device and a cell electrode, wherein each pixel further comprises a first storage capacitor connected between the switching device and a first capacitor electrode and a second storage capacitor connected between the switching device and a second capacitor electrode.

The use of two storage capacitors provides some freedom in the choice of the magnitude of the voltage swing provided on one terminal of one of the storage capacitors. In particular, if only one capacitor is used for coupling a voltage step change to the cell, the ratio of the two capacitances can dictate the proportion of the voltage step change which is coupled to the cell.

The first capacitor electrode may be common for all pixels of the display, and may be held at a fixed potential (for example ground), so that only the second capacitor electrode is subjected to changes in voltage which are to be capacitively coupled to the display cell. This provides a capacitor line drive type scheme.

The second capacitor electrode may be shared by the pixels of one row of the display, so that when a row is addressed, all of the data signals applied are subjected to the same increase or decrease in voltage through the capacitive coupling. A stepped voltage waveform can be applied to the second capacitor electrode, and positive and negative data can be applied to the pixels sequentially. For positive data, a step increase is capacitively coupled to the cell and for negative data, a step decrease is capacitively coupled to the cell.

The signal amplitude of the waveform applied to the second capacitor electrode can be equal to a power supply voltage used for other circuitry of the display device. This avoids the need for additional power circuitry for the voltage waveform applied to the capacitor electrode.

Once the signal amplitude has been selected, the ratio of the capacitances of the first and second storage capacitors can be selected to enable desired voltage levels to be achieved across the capacitive cell.

Preferably, the array is arranged in rows and columns, wherein each row of pixels shares a row conductor, which connects to the gates of the thin film transistors of the pixels in the row, and wherein each column of pixels shares a column conductor to which pixel drive signals are provided.

Row driver circuitry then provides row address signals for controlling the switching of the transistors of the pixels of the row, and column address circuitry provides the pixel drive signals.

The pixels preferably comprise liquid crystal display pixels.

The invention also provides a method of driving a pixel of a display device comprising an array of capacitive display pixels each comprising a capacitive cell and first and second storage capacitors, the method comprising:

applying a data signal to the cell of the pixel and to one terminal of the first and second storage capacitors, thereby charging the first and second storage capacitors;

isolating the data signal from the cell; and applying a step change in the voltage on a second terminal of one of the first and second storage capacitors, while maintaining the voltage on a second terminal of the other of the first and second storage capacitors substantially constant.

Examples of the invention will now be described in detail with reference to the accompanying drawings, in which.

Figure 1:
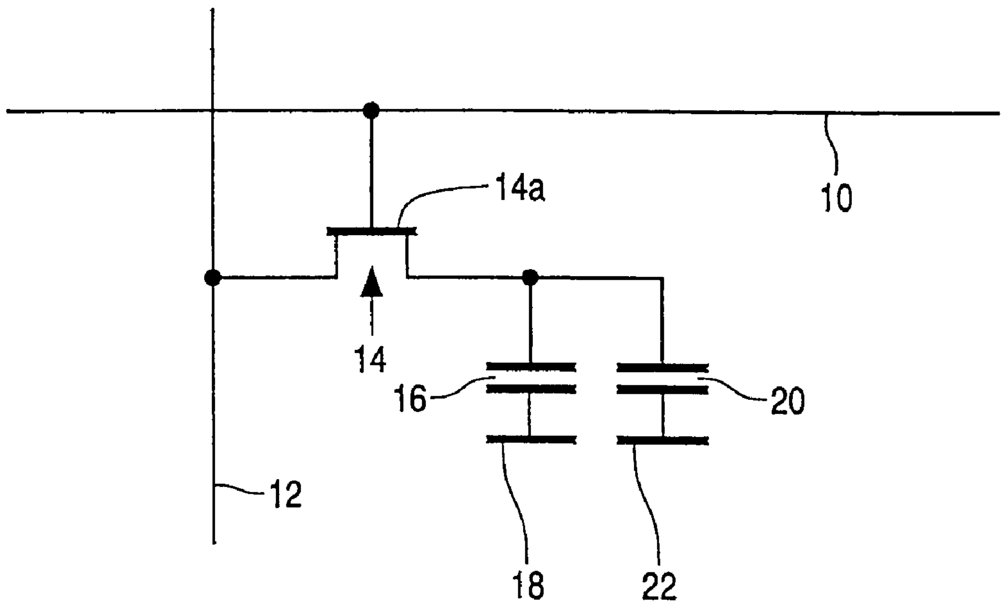
FIG.1 (PRIOR ART)
FIG. 1 shows one example of a known pixel configuration for an active matrix liquid crystal display.

FIG. 1 shows a conventional pixel configuration for an active matrix liquid crystal display. The display is arranged as an array of pixels in rows and columns. Each row of pixels shares a common row conductor 10, and each column of pixels shares a common column conductor 12. Each pixel comprises a thin film transistor 14 and a liquid crystal cell 16 arranged in series between the column conductor 12 and a common electrode 18. The transistor 14 is switched on and off by a signal provided on the row conductor 10. The row conductor 10 is thus connected to the gate **14*a* of each transistor 14 of the associated row of pixels. Each pixel additionally comprises a storage capacitor 20 which is connected at one end 22 to the next row electrode, to the preceding row electrode, or to a separate capacitor electrode. This capacitor 20 stores a drive voltage so that a signal is maintained across the liquid crystal cell 16 even after the transistor 14** has been turned off.

In order to drive the liquid crystal cell 16 to a desired voltage to obtain a required grey level, an appropriate signal is provided on the column conductor 12 in synchronism with a row address pulse on the row conductor 10. This row address pulse turns on the thin film transistor 14, thereby allowing the column conductor 12 to charge the liquid crystal cell 16 to the desired voltage, and also to charge the storage capacitor 20 to the same voltage. At the end of the row address pulse, the transistor 14 is turned off, and the storage capacitor 20 maintains a voltage across the cell 16 when other rows are being addressed. The storage capacitor 20 reduces the effect of liquid crystal leakage and reduces the percentage variation in the pixel capacitance caused by the voltage dependency of the liquid crystal cell capacitance.

The rows are addressed sequentially so that all rows are addressed in one frame period, and refreshed in subsequent frame periods.

Figure 2:
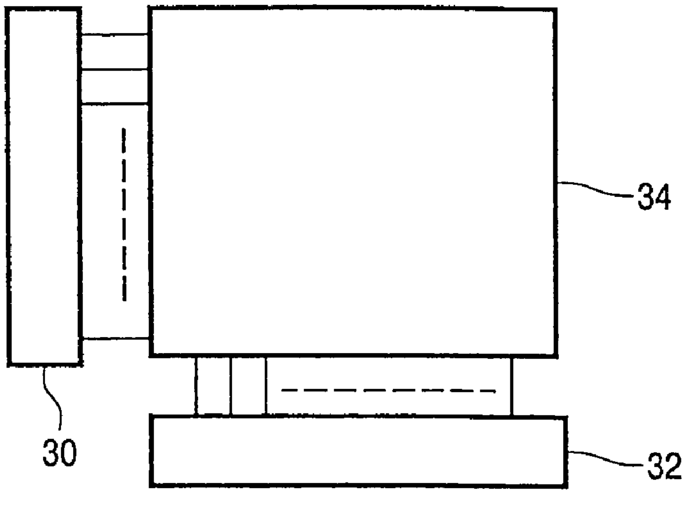
FIG. 2 shows a display device including row and column driver circuitry.

As shown in FIG. 2, the row address signals are provided by row driver circuitry 30, and the pixel drive signals are provided by column address circuitry 32, to the array 34 of display pixels.

In order to enable a sufficient current to be driven through the thin film transistor 14, which is implemented as an amorphous silicon or polycrystalline silicon thin film device, a high gate voltage must be used. In particular, the period during which the transistor is turned on is approximately equal to the total frame period within which the display must be refreshed, divided by the number of rows. The gate voltage for the on-state and the off-state differ by approximately 12 Volts for polysilicon displays in order to provide the required small leakage current in the off-state, and sufficient current flow in the on-state to charge or discharge the liquid crystal cell 16 within the available time.

For amorphous silicon displays, the row driver circuitry 30 uses high voltage components and is not conventionally integrated onto the substrate for amorphous silicon displays. In this case, it is desirable to minimise the number of voltage levels which must be coupled to the display substrate. For polycrystalline silicon displays, the row driver and column driver circuits can be integrated onto the substrate of the display. However, the power supply circuitry is separate, and typically includes external voltage regulators for each drive voltage required.

Figure 3:
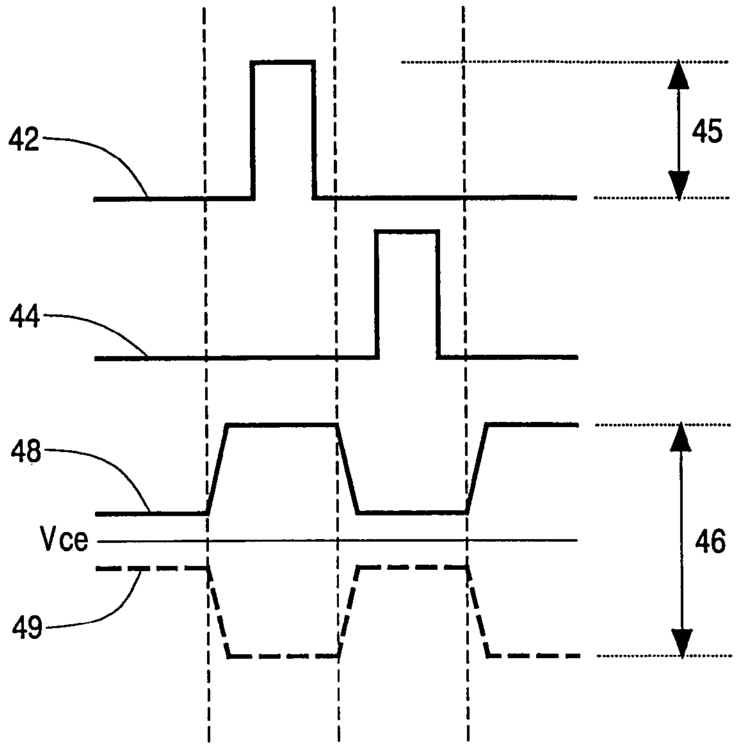
FIG.3 (PRIOR ART)
FIGS. 3 to 6 show different (known) row waveforms which may be used in the driving of an active matrix display.

FIG. 3 shows a first example of a known addressing scheme for driving the display of FIG. 1—in which no measures are taken to reduce the column voltage swings. A signal applied to each row comprises a periodic rectangular pulse 42, 44 of height 45 sufficient to fully turn on the transistor 14 (FIG. 1). This will depend on the structure of, and the technology used to form the transistor.

The voltage waveform for switching the LC material between different states typically has a voltage fluctuation 46 of around 5 to 10 Volts, particularly to provide polarity inversion. Polarity inversion involves alternately charging the liquid crystal material to positive and negative voltages, so that the average voltage across the LC cell during operation is zero. This prevents degradation of the material. The row waveforms in FIG. 3 represent the row driver pulse 42 for one row, the row driver pulse 44 for a subsequent row, and the signal to be applied to the column conductor as waveform 48. The waveform 48 is a positive polarity voltage waveform (in which the voltage is always above Vce) and the waveform 49 is a negative polarity voltage waveform (in which the voltage is always below Vce).

The voltage swing on the column electrode signal required by the drive scheme of FIG. 3 also requires the column address circuitry 32 to be implemented using high voltage components. However, alternative drive schemes exist with the aim of reducing the voltage swing on the column electrode 12, thereby enabling the column address circuitry 32 to be implemented using low voltage components.

Figure 4:
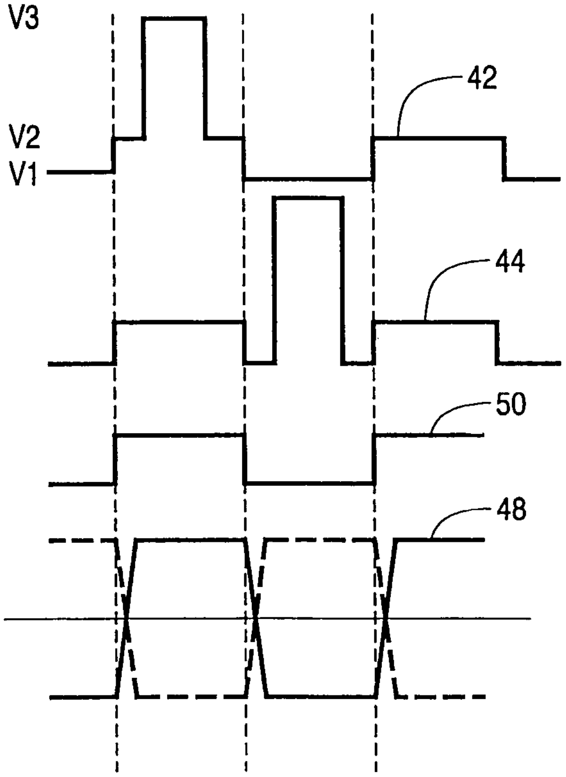
FIG.4 (PRIOR ART)

FIG. 4 shows a first example of an alternative known drive scheme, known as "common electrode drive". In this case, the voltage on the common electrode 18 is no longer constant, and is caused to fluctuate. This is shown at plot 50. This enables the voltage swing on the column electrode 12 (plot 48) to be reduced. In one example, the pixel storage capacitor is connected to an adjacent row electrode. However, this drive scheme requires a more complicated row waveform, and as illustrated in FIG. 4, each row pulse has three discrete voltages V1, V2, V3 defining the row signal waveform. It is possible to simplify the row waveform to a two-level signal by providing a separate storage capacitor electrode, to which a two-level signal is applied.

Figure 5:
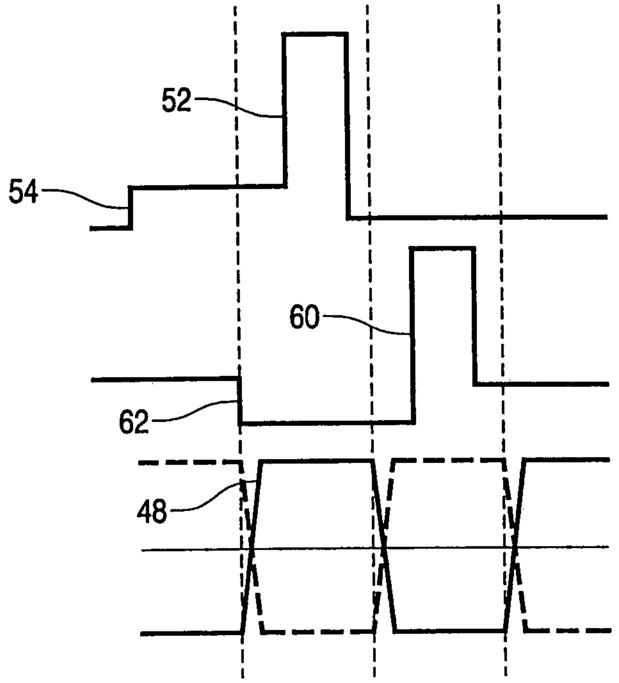
FIG.5 (PRIOR ART)

A further known alternative drive scheme is illustrated in FIG. 5, in which capacitive coupling between adjacent rows is relied upon to enable the voltage swing on the column electrode 12 to be reduced. This scheme requires pixel configurations with storage capacitors connected to an adjacent row. In this scheme, a row pulse 52 for one row is preceded by an incremental step increase 54, whereas the row pulse 60 for the next row is preceded by an incremental step decrease 62. These intermediate step levels may be provided on both sides of the pulse 50, 60 or only at the input to the pulse 50, 60. Again, a three level waveform results.

Figure 6:
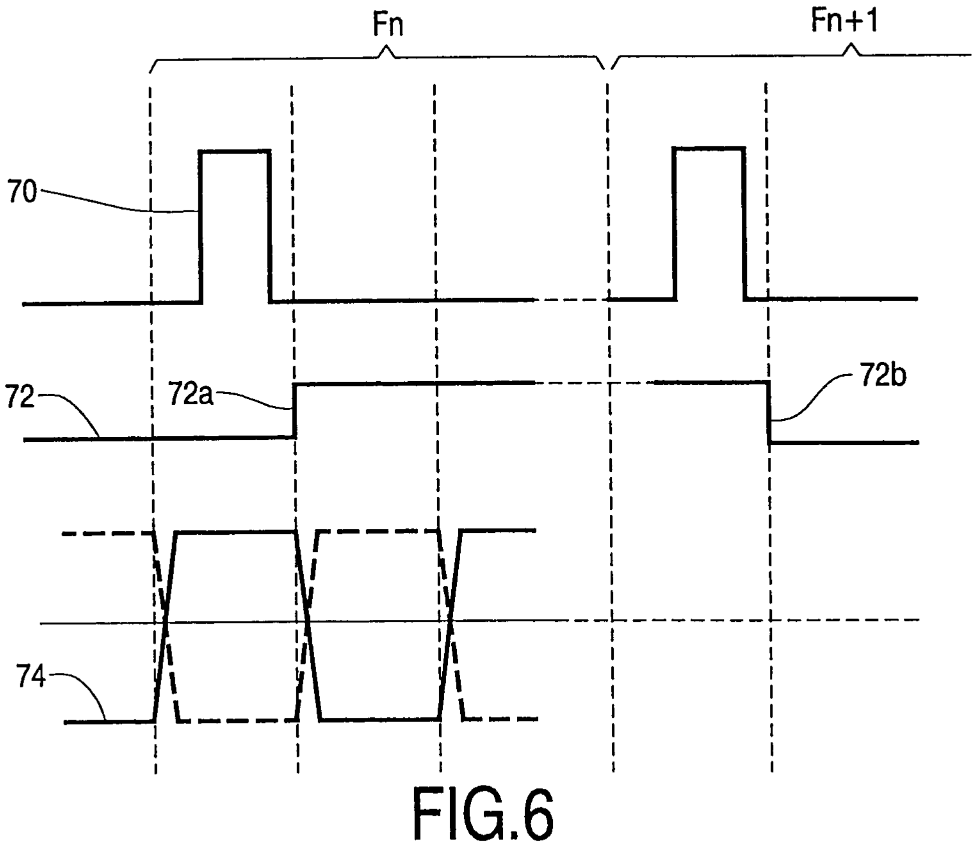

FIG. 6 shows the capacitor line drive scheme, in which capacitive coupling of a voltage step on one terminal of the storage capacitor (18 in FIG. 1) causes an increase or decrease in the voltage across the cell. This scheme enables simple row waveforms 70 to be used, and a square waveform 72 is applied to the storage capacitor terminal 22. In one frame period $F_n$, a positive going voltage step 72$a$ is applied to the capacitor line and in the next frame period $F_{n+1}$ a negative going step 72$b$ is applied. The step occurs shortly after the row of pixels has been addressed and therefore a separate capacitor line drive signal 72 is needed for each capacitor line (row of pixels) in the display. These signals are generated by a capacitor line drive circuit which is normally located on the opposite side of the display to the row drive circuit. Since an additional drive circuit is required, capacitor line drive is most suitable for polysilicon displays where this can be integrated at no extra cost.

The column signal 74 (for each column) is again sampled during the row pulse 70.

These drive schemes will be well known to those skilled in the art, and some of these operational techniques are described in greater detail, for example in U.S. Pat. No. 5,130,829 and WO 99/52012.

The invention will now be described as an improvement to the capacitor line drive scheme described with reference to FIG. 6. However, the principal of the invention, which is to use multiple storage capacitors, may be used to modify the other drive schemes in order to simply the generation of multiple level waveforms.

Figure 7:
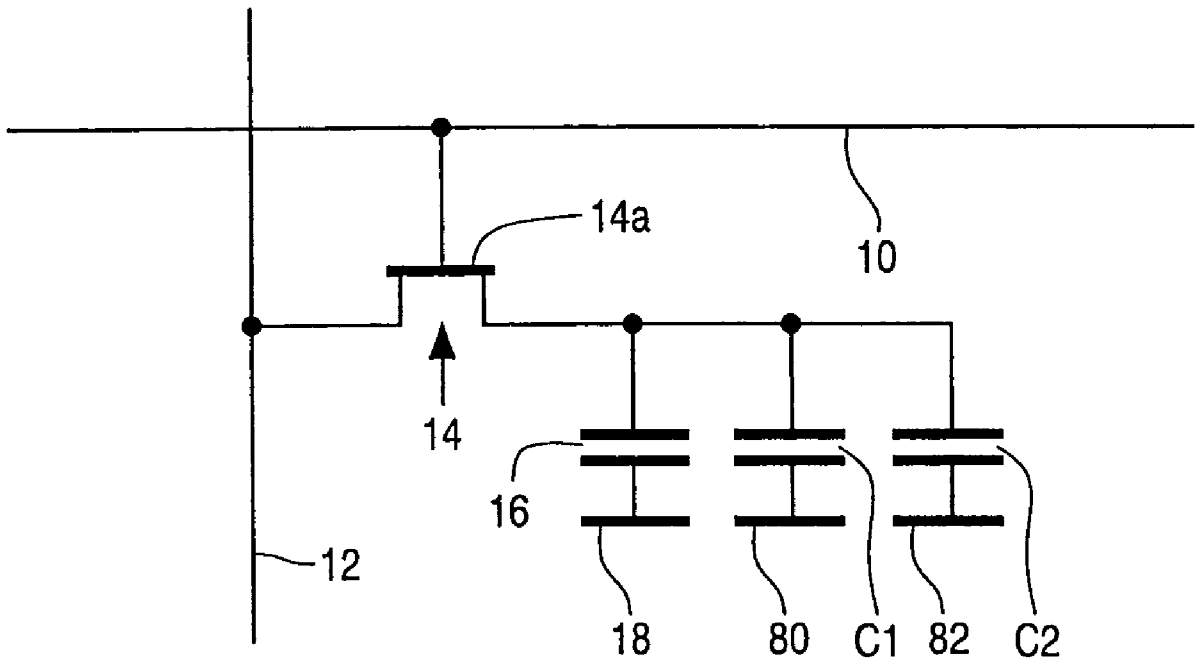
FIG. 7 shows a pixel arrangement of the invention.

FIG. 7 shows a pixel arrangement according to one example of the invention, and for use with the capacitor line drive scheme. It will be understood that the pixel design is used in an array of pixels such as shown in FIG. 2 (although an additional capacitor line drive circuit is required as discussed above).

The same references are used as in FIG. 1 for the same components. Each pixel has the transistor 14 and capacitive cell (for example LC cell) 16 connected between the transistor 14 and a common electrode 18. Each pixel has a first storage capacitor C1 connected between the transistor and a first capacitor electrode 80 and a second storage capacitor C2 connected between the transistor and a second capacitor electrode 82.

In this specific example, the first capacitor electrode 80 is grounded, whereas the second capacitor electrode 82 is coupled to a square wave voltage waveform. In this way, the step changes in voltage on the electrode 82 are passed to the cell 16 in dependence on the ratio of the two capacitances of C1 and C2.

The benefit of this arrangement can be understood from an analysis of the charge transfer. For the purpose of this analysis, we will assume the column voltage drive level varies from 0 to Vcol, and the voltage swing in the square wave capacitor electrode waveform (72 in FIG. 6) is Vcap, and that the maximum required peak to peak LC voltage is 5.6V and the minimum peak to peak LC voltage is 1.8V. We can also assume that there is a given required relationship between the LC capacitance $C_{LC}$ and the storage capacitor value $C_S$, for example $C_S=3C_{LC}$.

Initially, a voltage is applied to the cell from the column. This voltage is then isolated from the LC cell at the end of the row address pulse. A subsequent step change in voltage on the storage capacitor is capacitively coupled to the LC cell.

For the conventional pixel of FIG. 1, the maximum positive cycle voltage applied to the LC cell is Vcol, plus the voltage resulting from capacitive coupling of a step increase in plot 72.

Thus, the maximum voltage is:

$$\mathrm{Vcol}+\mathrm{Vcap}(C_S/(C_S+C_{LC}))$$

The minimum negative cycle voltage applied to the LC cell is 0 (zero on the column), minus the voltage resulting from capacitive coupling of a step decrease in plot 72.

Thus, the minimum voltage is:

$$-\mathrm{Vcap}(C_S/(C_S+C_{LC}))$$

The maximum peak to peak voltage swing is therefore:

$$\mathrm{Vcol}+2\mathrm{Vcap}(C_S/(C_S+C_{LC}))$$

The lowest positive cycle voltage applied to the LC cell is 0 plus the voltage resulting from capacitive coupling of a step increase in plot 72.

Thus, the minimum positive cycle voltage is:

$$\mathrm{Vcap}(C_S/(C_S+C_{LC}))$$

The highest negative cycle voltage applied to the LC cell is Vcol minus the voltage resulting from capacitive coupling of a step decrease in plot 72.

Thus, the maximum negative cycle voltage is:

$$\mathrm{Vcol}-\mathrm{Vcap}(C_S/(C_S+C_{LC}))$$

The minimum peak to peak voltage swing is therefore:

$$2\mathrm{Vcap}(C_S/(C_S+C_{LC}))-\mathrm{Vcol}$$

The requirements set out above can be achieved with Vcap=2.47V and Vcol=1.9V. However, this voltage level will not be readily available, and additional circuitry will be required to generate the voltage waveform 72 of FIG. 6.

For the pixel of the invention in FIG. 7, we can assume that the total storage capacitance $C_1+C_2$ is subject to the same requirement that $C_1+C_2=3C_{LC}$. The maximum peak to peak voltage swing can be calculated by the same analysis, and is:

$$\mathrm{Vcol}+2\mathrm{Vcap}(C_2/(C_1+C_2+C_{LC}))$$

The minimum peak to peak voltage swing is:

$$2\mathrm{Vcap}(C_2/(C_1+C_2+C_{LC}))-\mathrm{Vcol}$$

This enables the value of Vcap to be selected as desired, for example Vcap may be set at the power supply voltage for the display module, for example 3.3V.

If Vcap=3.3V and Vcol is again 1.9V, then the other constraints give:

$$(C_2/(C_1+C_2+C_{LC}))=0.561$$

The additional constraint of $C_1+C_2=3C_{LC}$ gives $C_2/C_1=2.96$.

Thus, it is possible to drive the capacitor electrodes of the display using square waveforms with amplitude equal to the power supply voltage. Selection of the values of the two storage capacitors enables the desired voltage swing across the LC material to be achieved.

In the calculations above, no account is taken of the fact that the value of $C_{LC}$ depends on the pixel drive voltage (a black pixel normally has a higher capacitance than a white pixel). This additional effect would in practice be taken into account when calculating the required column drive voltage and storage capacitor ratio.

It will be understood that the invention provides an extra degree of freedom in the choice of voltage levels. This has been shown to have advantages for the capacitor line drive scheme, and this is the preferred implementation of the invention.

However, it is possible for the invention to be used to simplify other drive schemes, some of which have been outlined above.

Whilst the example above provides three electrodes, one cell electrode and two storage capacitor electrodes, if the invention is used to modify the common electrode drive scheme, for example, the same signal may be applied to one of the capacitor electrodes as to the cell electrode.

In the example above, one capacitor electrode is connected to a switching voltage waveform and the other is connected to a fixed potential. The scheme could also be implemented with a switching voltage waveform applied to both capacitor terminals. This might allow a more compact pixel layout or other advantages. For example, a single driven capacitor line may be provided for each row of pixels. The second storage capacitor could then be connected to the capacitor line of the preceding or following row of pixels.

Alternatively, each row of pixels may have two driven capacitor lines carrying complimentary signals. One storage capacitor could be connected to each capacitor line and the ratio of the capacitors would determine both the magnitude and the polarity of the signal coupled onto the pixel. This technique could be used to implement a column or pixel inversion scheme where alternate pixels along the row are driven with signals of opposite polarity.

The terms "row" and "column" are somewhat arbitrary in the description and claims. These terms are intended to clarify that there is an array of elements with orthogonal lines of elements sharing common connections. Although a row is normally considered to run from side to side of a display and a column to run from top to bottom, the use of these terms is not intended to be limiting in this respect.

The above numerical example shows how one particular desired drive scheme can be used to determine the capacitor ratio to enable existing voltage levels to be used. Of course, the analysis can be applied to any desired drive scheme, which will of course depend on the type of LC or other capacitive display cell being driven.

Other features of the invention will be apparent to those skilled in the art.

The invention claimed is:

1. A display device comprising an array of capacitive display pixels, each pixel comprising:
- a thin film transistor switching device;
- a capacitive cell, the cell being connected between the switching device and a cell electrode;
- a first storage capacitor connected between the switching device and a first capacitor electrode; and
- a second storage capacitor connected between the switching device and a second capacitor electrode,
- wherein at least one of the first and second capacitor electrodes is not connected to ground, and
- wherein the first capacitor electrode is common for all pixels of the display.

2. A device as claimed in claim 1, wherein the first capacitor electrode is connected to ground.

3. A device as claimed in claim 1, wherein the second capacitor electrode is shared between rows of pixels of the display.

4. The device of claim 3, wherein the array is arranged in rows and columns, wherein each row of pixels shares a row conductor, which connects to the gates of the thin film transistors of the pixels in the row, and wherein each column of pixels shares a column conductor to which pixel drive signals are provided.

5. A device as claimed in claim 1, wherein the capacitive cell comprises a liquid crystal cell.

6. The device of claim 1, wherein the thin film switching device comprises a single thin film transistor having a first terminal connected to both the first and second capacitors.

7. The device of claim 1, wherein the first capacitor electrode is connected to a fixed voltage, and the second capacitor electrode is connected to a switching voltage waveform.

8. The device of claim 7, wherein the first capacitor electrode is connected to ground.

9. The device of claim 1, wherein the array is arranged in rows and columns, wherein each row of pixels shares a row conductor, which connects to the gates of the thin film transistors of the pixels in the row, and wherein each column of pixels shares a column conductor to which pixel drive signals are provided.

10. A device as claimed in claim 9, wherein row driver circuitry provides row address signals for controlling the switching of the transistors of the pixels of the row, and column address circuitry provides the pixel drive signals.

11. A method of driving a pixel of a display device comprising an array of capacitive display pixels each comprising a capacitive cell and first and second storage capacitors, the method comprising:
- applying a data signal to the cell of the pixel and to one terminal of the first and second storage capacitors, thereby charging the first and second storage capacitors;
- isolating the data signal from the cell; and
- applying a step change in the voltage on a second terminal of one of the first and second storage capacitors, while maintaining the voltage on a second terminal of the other of the first and second storage capacitors substantially constant.

12. The method of claim 11, where the voltage on the second terminal of the other of the first and second storage capacitors is a ground voltage.

13. A display device comprising an array of capacitive display pixels, each pixel comprising:
- a thin film transistor switching device;
- a capacitive cell, the cell being connected between the switching device and a cell electrode;
- a first storage capacitor connected between the switching device and a first capacitor electrode; and
- a second storage capacitor connected between the switching device and a second capacitor electrode,
- wherein at least one of the first and second capacitor electrodes is not connected to ground, and
- wherein the first capacitor electrode is connected to a first switching voltage waveform, and the second capacitor electrode is connected to a second switching voltage waveform, wherein the second switching voltage waveform is complementary to the first switching voltage waveform.

* * * * *